United States Patent [19]

Gale

[11] 4,062,628

[45] Dec. 13, 1977

[54] BLACK-AND-WHITE DIFFRACTIVE SUBTRACTIVE LIGHT FILTER

[75] Inventor: Michael Thomas Gale, Gattikon, Switzerland

[73] Assignee: RCA Corporation, New York, N.Y.

[21] Appl. No.: 671,105

[22] Filed: Mar. 29, 1976

[30] Foreign Application Priority Data

Mar. 9, 1976 United Kingdom ............... 1917/76

[51] Int. Cl.² .................... G02B 5/18; G02B 5/22
[52] U.S. Cl. .................... 350/162 R; 350/162 SF; 350/314
[58] Field of Search ............. 350/162 R, 162 SF, 314

[56] References Cited

U.S. PATENT DOCUMENTS

| 3,732,363 | 5/1973 | Glenn, Jr | 350/162 SF UX |
| 3,957,354 | 5/1976 | Knop | 350/314 X |

Primary Examiner—John K. Corbin
Assistant Examiner—John D. Lee
Attorney, Agent, or Firm—H. Christoffersen; Samuel Cohen; George J. Seligsohn

[57] ABSTRACT

The disclosed filter provides (1) a high contrast between black and white together with a substantially neutral black and/or (2) a gray-scale color (wavelength) characteristic which is substantially independent of luminosity, and is preferably neutral. Neutral black is achieved when two superimposed, crossed, sine-wave gratings embossed in plastic have different depths which are selected to provide a zero-diffraction-order-light transmittance wavelength selectivity characteristic for any one of the phase gratings which exhibits a minimum zero-diffraction-order-light transmittance at desired different wavelengths in the visible spectrum. A gray scale is achieved by mixing black-manifesting subareas with white-manifesting subareas.

12 Claims, 10 Drawing Figures

Fig. 1.

WHITE REGION 300
Fig. 3a.

LIGHTER GRAY REGION 302
Fig. 3b.

DARKER GRAY REGION 304
Fig. 3c.

ZERO-ORDER TRANSMITTANCE IN THE VISIBLE FOR SINUSOIDAL GRATING ($a = 0.87 \mu m$, $n = 1.5$)

Fig. 2.

BLACK REGION 306
Fig. 3d.

BLACK-AND-WHITE DIFFRACTIVE SUBTRACTIVE LIGHT FILTER

BACKGROUND OF THE INVENTION

1. Field of the Invention:

This invention relates to an improved diffractive subtractive filtering technique for reconstructing black-and-white images in an optical projector using the zero diffraction order of light transmitted through a diffractive structure in which a grating-like carrier is modulated with the image information.

2. Description of the Prior Art:

U.S. Pat. No. 3,732,363 of W. E. Glenn, Jr., issued May 8, 1973, discloses a diffractive substractive filter in the form of a single, amplitude-modulated sinusoidal diffraction grating having a predetermined line spacing, which may be embossed as a relief pattern in the surface of a medium such as transparent thermoplastic film. The amplitude of the sinusoidal grating varies from point to point in accordance with recorded pictorial or alphanumeric information. More specifically, the sinusoidal grating has a predetermined amplitude depth corresponding to all "black" points of the recorded pictorial or alphanumeric information, has a zero amplitude corresponding to all "white" points of the recorded pictorial or alphanumeric information, and has respective amplitudes greater than zero but less than the predetermined amplitude corresponding to varying degress of "gray" points of the recorded pictorial or alphanumeric information.

Readout of the recorded pictorial or alphanumeric information, in U.S. Pat. No. 3,732,363, may be achieved in an optical projector by illuminating the diffractive subtractive filter with white light and imaging onto a screen only the zero diffraction order of the light which emerges from the filter. More specifically, most of the light incident on regions of the filter having the aforesaid predetermined amplitude, corresponding to black points, is diffracted into higher diffraction orders, so that only a small portion of the incident light corresponding to black points is present in the zero diffraction order which is imaged. Therefore, these black points exhibit low luminosity and appear relatively black in the image. However, light incident in the zero-amplitude portion of the filter, corresponding to white points, passes undiffracted through the filter, so that substantially all the incident light corresponding to white points remains within the zero diffraction order of light which is imaged. Therefore, these points exhibit high luminosity and appear white in the image. The relative amount of incident light diffractively subtracted from the zero diffraction order and deflected into the higher diffraction orders by respective intermediate-amplitude region of the filter, corresponding to points of varying shades of "gray", is greater than it is for the white points but less than it is for the black points. Therefore, these points exhibit intermediate luminosites and appear gray in the image.

The contrast of a black-and-white image obtainable with a diffractive subtractive filter of the type disclosed in U.S. Pat. No. 3,732,363 on reconstruction in an optical projector depends upon the ratio between the relatively low luninosity of a black image point to the relatively high luminosity of a white image point. The contrast obtainable from such a single, amplitude-modulated sinusoidal diffraction grating, of the type disclosed in U.S. Pat. No. 3,732,363, is relatively poor.

However, in a paper entitled "Transmission Characteristics of Sinusoidal Phase Gratings", presented at the 1973 Annual Meeting of the Optical Society of America, Rochester, New York, C.S. Ih disclosed that zero-order contrast on reconstruction in an optical projector can be improved by the superposition of a number of sine wave gratings.

U.S. Pat. No. 3,957,354, issued May 18, 1976, and assigned to the same assignee as the present application, discloses a diffractive subtractive color filtering technique. It is disclosed in U.S. pat. No. 3,957,354, that the relative amount of incident light which is diffracted by a diffractive structure to higher orders in a given function of light wavelength (color of the light) which depends soley on (1) the particular shape of the profile (sinusoidal, square wave, etc.) of the diffractive structure and (2) the peak-to-peak optical amplitude (i.e. physical peak-to-peak amplitude multiplied by the difference between the index of refraction of the diffractive structure and that of its surroundings) of the diffractive structure profile.

One of the profile shapes considered in U.S. Pat. No. 3,957,354 is a sinusoid. It is shown that a sinusoidal profile exhibits a relatively small wavelength selectivity compared to that exhibited by a square-wave profile. Therefore, with a sinusoidal profile, it is possible to select a particular predetermined peak-to-peak optical amplitude such that substantially all the incident light at some given wavelength in the middle of the visible spectrum (i.e. at some point in the green) is diffracted into the higher diffraction orders, and still, in this case, diffract a significant, but smaller, amount of the incident light at the opposite ends of the visible spectrum (the red end and the blue end) into the higher diffraction orders. Therefore, even when the luminosity of the light remaining in the zero diffraction order is relatively at its minimum, its color is not a neutral black or neutral dark gray, but is actually a dark shade of magenta. This is true because the relative intensity of light still remaining in the imaged zero diffraction order in both the red and in the blue portions of the visible spectrum is significantly greater than that in the green portion of the visible spectrum.

Further, in the gray-scale of zero-diffraction-order-light luminosity achieved by the approach disclosed in U.S. Pat. No. 3,732,363, (i.e. varying the relative "grayness" as continuous function of amplitude of a single sinusoidal grating between zero and a predetermined maximum where the luminosity of the zero-diffraction-order light is a minimum), the color hue of the zero diffraction order is not constant, but varies because the wavelength color selectivity characteristics of a sinusoidal diffractive structure change as a function of amplitude. Thus, if black is manifested by a certain dark shade of magenta, "light gray" is manifested by a relatively light tint of some other different color. Therefore, a diffractive substractive structure of the type disclosed in the aforesaid U.S. Pat. No. 3,732,363 is not capable of producing an essentially neutral black-and-white image, when reconstructed in an optical projector.

SUMMARY OF THE INVENTION

The present invention is directed to a diffractive-substractive filter for imaging black-and-white images which exhibits one or both of the following features: (1) a higher contrast between black and white together with a substantially neutral black and/or (2) a gray-scale color (wavelength) characteristic which is substantially independent of luminosity, and is preferably neutral. These features may be achieved by employing one or more diffractive substractive structures, each of which is composed of at least two superimposed, angularly-displaced sinusoidal gratings (preferably, two superimposed sinusoidal gratings which are angularly displaced by 90°). The use of at least two such superimposed, angularly displaced sinusoidal gratings increases the white-to-black contrast capability of the zero diffraction order image derived therefrom. Further, by properly choosing the peak-to-peak amplitudes of each of the superimposed, angularly-displaced sinusoidal gratings to have certain different preselected values, a substantially neutral black may be obtained over the entire visible spectrum. An effective gray scale having color-characteristics, perferably neutral, over the visible spectrum which are substantially independent of zero-diffraction-order luminosity may be achieved by a mixture of white-manifesting clear (zero amplitude) sub-areas of the filter interspersed with subareas covered by black-manifesting sinusoidal diffractive structures, the relative proportion of any given region of the filter covered by each of these two types of subareas being determined in accordance with the relative zero-diffraction-order luminosity desired in that region.

DETAILED DESCRIPTION

The type of diffractive structures, with which the present invention is concerned, are phase diffractive structures, rather than absorption diffractive structures. In principle, such phase diffractive structures may take the form of (1)a reflective phase diffractive structure, (2) a variation in the index of refraction of a transmissive medium which corresponds to the phase diffractive structure, (3) a relief pattern in the surface of a transmissive medium, in which the transmissive medium has a substantially uniform index of refraction different from that of its surroundings, and the relief pattern corresponds with the phase diffractive structure or (4) a combination of some or all the aforesaid forms of phase diffractive structures. However, a phase diffractive structure which takes the form of a relief pattern in the surface of a transmissive medium having a substantially uniform index of refraction different from that of its surroundings is the most practical form or a phase diffractive structure comprising a diffractive subtractive filter. This is true because (1) this form nay be inexpensively replicated by hot pressing a substantially transparent plastic material and (2) readout of this form may be compatibly accomplished with standard projectors and viewers. Therefore, in the preferred embodiment of the invention described below, it is assumed that the diffractive substractive filter is in the form of a relief pattern embossed on the surface of a tranmsissive medium having a substantially uniform index of refraction greater than the surrounding air. However, it should be understood that the principles of the present invention apply with equal force to all the other types of phase diffractive structures discussed above.

Figure 1:
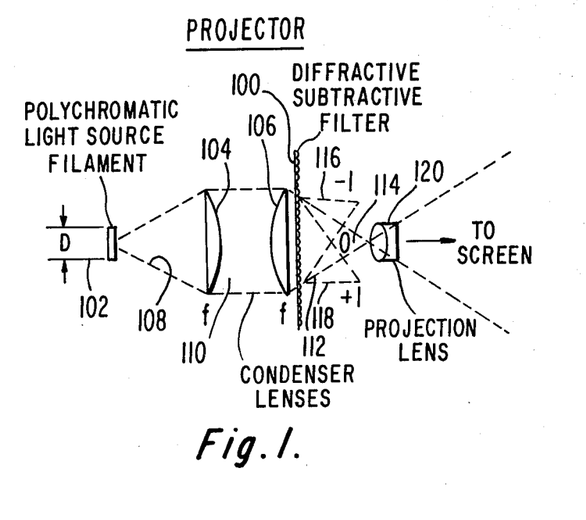
FIG. 1 is a schematic of a projector for projecting only the zero diffraction order derived from a surface relief pattern transmissive diffracting medium.

Referring now to FIG. 1, there is shown schematically a typical example of a projector for projecting solely the zero order diffraction of diffractive subtractive filter 100 on the screen. More specifically diffractive filter 100 perferably comprises a transparent sheet of material, such as embossed plastic, having a substantially uniform predetermined index of refraction different from that of the surrounding ambient, such as air. This sheet of material includes a surface relief pattern of spatially distributed diffraction elements. Each diffraction element has waveform profile characteristics and optical peak-to-peak amplitude characteristics of the type described in detail below.

Diffractive substractive filter 100 is illuminated with polychromatic light from a source which preferably comprises an incandescent filament 102 emittng broadband white light. The width (i.e. diameter or largest cross-sectional dimension) of filament 102 is D, as shown in FIG. 1. A pair of condenser lenses 104 and 106, each having focal length $f$, are situated as shown in FIG. 1 with filament 102 located in the front focal plane of condenser lens 104. Therefore, the diverging light beam 108 is collimated in parallel light beam 110 by condenser lens 104. Condenser lens 106 converts parallel light beam 110 into converging light beam 112.

Diffractive substractive filter 100, which is situated as shown in relatively close proximity to condenser lens 106 and in the path of converging light beam 112, is illuminated by converging light beam 112. The light output from diffractive substractive filter 100 consists of the zero diffraction order 114 and the higher diffraction orders, such as −1order 116 and +1order 118. Projection lens 120, which is situated solely in the path of zero diffraction order 114, is effective in projecting soley the zero diffraction order output light 114 on a screen. Selective projection is accomplished by the deflection of all the higher diffraction order output light such as −1and +1order output light 116 and 118 beyond the aperture of projection lens 120, as shown in FIG. 1. The projector schematically shown in FIG. 1 is compatible with conventional projectors and viewers, such as slide projectors and viewers and motion picture projectors.

In the readout of a zero order diffraction image, with a conventional projector of the type shown in FIG. 1, regions of the diffractive substractive filter 100 which do not contain any diffraction grating transmit the incident light unaffected and are, therefore, reconstructed in the image as white. Regions in which the grating is present diffract at least some of the incident light into the first and higher diffraction orders, which fall outside the aperture of lens 120. Therefore, this diffracted light is subtracted from the zero-diffraction imaged light, so that these latter regions appear relatively dark.

As known, the first order diffraction angle $\alpha$ is related to the grating period $d$ such that sin $\alpha$ approximately equals the ratio of the wavelength $\lambda$ to the grating period $d$. In order to ensure that none of the first order light overlaps the zero order light in the plane of projection lens 120, the first order diffraction angle $\alpha$ must be sufficiently large over the entire visible spectrum of between 400 and 700 nm. The majority of present day, commercial projectors have a projection lens aperture of about F/2.8 and require that a grating period $d \sim 1.4\mu m$ for full compatibility ($\alpha$ varying from about 17° at the blue end of the spectrum to about 30° at the red end of the spectrum). Given this grating period, there are in principle many grating relief profiles which can be used. However, it is important that the chosen profile can be readily recorded in practice. This requirement is best satisfied by a sine wave relief profile, which can be recorded as an interference of two plane, coherent wavefronts (derived from a laser beam) using a photoresist recording medium. Other profiles, such as sawtooth or triangular, canot be easily recorded with diffraction periods $d$ approximately equal to 1.4$\mu m$.

The zero order transmittance T of a relief sine-wave profile phase grating is given by:

$$J_0^2 \ T = (\frac{\pi}{\lambda} a) = J_0^2 \ (\frac{\pi a' \Delta n}{\lambda}); \quad (1)$$

where $J_0$ is the zero-order Bessell function of the first kind, $a$ is the optical depth (peak-to-peak) of a sine wave profile, $a'$ is the physical depth (peak-to-peak) of a sine wave profile relief in the surface of a transmissive medium, $\Delta n$ is the difference in refractive index between the transmissive medium and its surroundings (usually air), and $\lambda$ is the free space wavelength of any incident light component.

Figure 2:
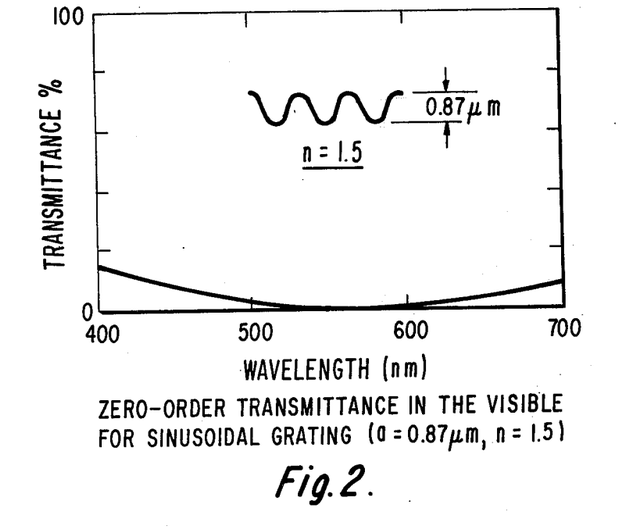
FIG. 2 is a graph showing the zero-order transmittance for visible light as a function of wavelength for a single sinusoidal grating having a value of peak-to-peak optical amplitude which results in minimum zero-order transmittance for light having a wavelength at a point near the middle of the visible spectrum.

Suitable choice of a single sinusoidal profile, having an appropriate value of physical depth $a'$, gives a transmittance which is minimum in the green and provides a relatively low luminosity over the whole visible range. Specifically, as shown by way of example in FIG. 2, the zero-order transmittance for the visible spectrum of a single sinusoidal grating having a physical depth $a'$ equal to 0.87$\mu m$ in the surface of a transparent plastic, such as polyvinyl chloride, having a nominal value of index of refraction $n$ of 1.5, provides a transmittance of more than 10 % at the blue end (400nm) of the spectrum, dropping to substantially zero at a point in the green middle (500–600 nm) portion of the spectrum and then rising again to somewhat less than 10% at the red end (700 nm) of the spectrum. In order to provide a neutral black, the zero order transmittance should be substantially flat over most of the visible (400–700 nm) spectrum. However, as can be seen from FIG. 2, zero order transmittance of a single sinusoidal grating is not substantially flat over the visible spectrum, but exhibits a significant wavelength selectivity. In particular, the transmitted zero order light for the sinusoidal grating shown in FIG. 2, when illuminated with white light, exhibits a dark magenta shade produced by the relatively large amounts of zero-order transmitted light in the blue and red portions of the spectrum compared to that in the green portion of the spectrum.

The best recording medium for originally recording a sinusoidal relief pattern is a positive photoresist, such as SHIPLEY AZ1350. By proper development of this photoresist (described in detail below), high resolution recording of a sinusoidal pattern can be achieved with fair linearity. However, because complete linearity cannot be obtained, some distortion of the sine-wave depth profile occurs. When such a photoresist original recording is used to ultimately derive embossed plastic replicas, in a manner known in the art, the final embossing stage introduces additional distortion in the sine-wave profile. The effect of these distortions is that the predicted theoretical luminous density in zero-order is not realized in practice in the embossed thermoplastic replicas. For example, a single sine-wave grating with an optical depth $a$ of 450 nm, provides a theoretical zero-order density for the filter of 2.05. However, due to the aforesaid distortions, such an embossed single sine-wave grating exhibits a typical density of only about 1.3. That is, in practice, the contrast exhibited by an embossed black-and-white diffractive subtractive filter comprising a single sine-wave grating is relatively poor.

The zero order contrast obtainable from a black-and-white diffractive subtractive filter may be increased by superimposing at least two angularly-displaced sine-wave gratings. For example, two crossed sine-wave gratings with an optical depth $a$ of 450 nm exhibit a theoretical zero-order density of 3.59 (rather than the 2.05 zero-order density of a single sine-wave grating) but, in practice, a typical zero-order density obtained for an embossed replica of two crossed sine-wave gratings is only about 1.8 (rather than the 1.3 value of a single sine-wave grating). Thus, in practice, it is necessary to use at least two superimposed gratings to obtain good contrast, although in theory a single grating would suffice. However, undesired wavelength (color) selectivity of a single sine-wave grating discussed above in connection with FIG. 2, is substantially increased when two crossed sine-wave gratings with the same optical amplitude $a$ are employed, so that there is produced a "muddy" black with observable color, rather than a desirable neutral black. Further, the unwanted zero-order color is not constant, but varies with the value of the optical depth $a$ of the gratings, which is most undesirable in a gray scale. In typical projectors and viewing environments this zero-order color is readily observable at luminous densities of about 1.8 such as those obtained for embossed replicas of two crossed sine-wave gratings. The observed color follows the general color sequence as a function of the grating optical amplitudes $a$ as described in detail below in connection with FIG. 4.

Figure 3A:
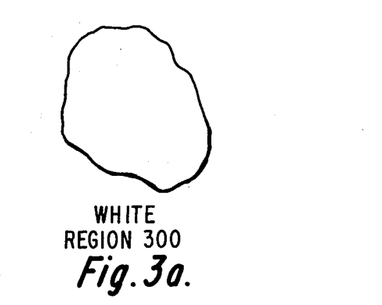
FIGS. 3a, 3b, 3c and 3d, respectively, schematically show a white region, a lighter gray region, a darker gray region and a black region of a black-and-white diffractive substractive filter embodying the principles of the present invention.

Referring now to FIGS. 3a, 3b, 3c and 3d, there is schematically shown a black-and-white diffractive subtractive filter incorporating two crossed sine-wave gratings which exhibit a substantially non-wavelength selective gray scale. Specifically, FIG. 3a schematically shows a white manifesting region 300 in which no diffraction structures are present. Therefore, substantially all light incident on white region 300 is undiffracted and, therefore, remains in the imaged zero diffraction order. "Lighter-gray" manifesting region 302, shown in FIG. 3b, and "darker-gray" manifesting region 304, shown in FIG. 3c, of a diffractive subtractive filter are both divided into sub-areas covered by diffractive structure (such as the subareas covered by diffractive structures 302a in FIG. 3b and by diffractive structures 304a in FIG. 3c) and by subareas left uncovered by such diffractive structure (such as subareas 302b in FIG. 3b and 304b in FIG. 3c). The only material structural difference between lighter-gray region 302 and darker-gray region 304 is that the proportion of the overall area of darker-gray region 304 covered by diffractive structure subareas 304a is greater than the proportion of the overall area of lighter-gray region 302 covered by diffractive-structure subareas 302a. In the case of any "all-black" manifesting region 306 of a subtractive diffractive filter, shown in FIG. 3d, the entire area thereof is covered by a diffractive structure 306a. Except for their respective sizes, all of diffractive structures 302a, 304a and 306a are substantially identical.

Figure 3B:
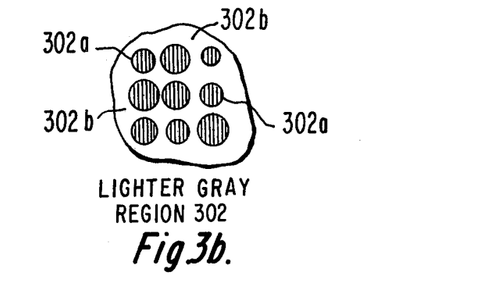
Figure 3C:
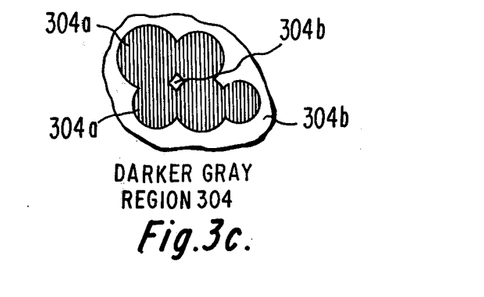
Figure 3D:
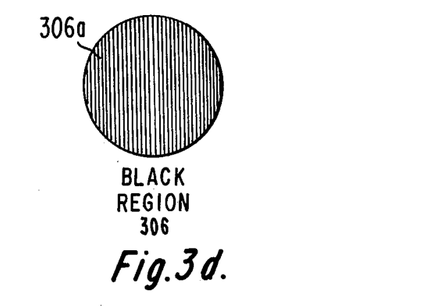

Specifically, each one of diffractive structures 302a, 304a and 306a comprises two superimposed crossed sinusoidal gratings, which are angularly displaced from each other by substantially 90°. Although the respective optical depths a $a_1$ and $a_2$ and the corresponding physical depths a $a'_1$ and $a'_2$ of the two crossed sinusoidal gratings may be equal to each other, they preferably have different values selected to provide a neutral black, as described below. In any case, the respective optical depths of the sinusoidal gratings are selected to provide substantially a minimum zero-order luminosity for each respective subarea covered by any of diffractive structures 302a, 304a and 306a. Further, the respective sizes of each individual one of the diffractive-structure subareas 302a and 304a and the respective sizes of each individual one of non-diffractive subareas 302b and 304b of each of lighter and darker gray regions 302 and 304 should be sufficiently small to be individually substantially unresolvable in the zero order diffraction image. However, each individual one of these diffractive structures should still be large with respect to the line spacing d of its constituent sinusoidal gratings.

Figure 4:
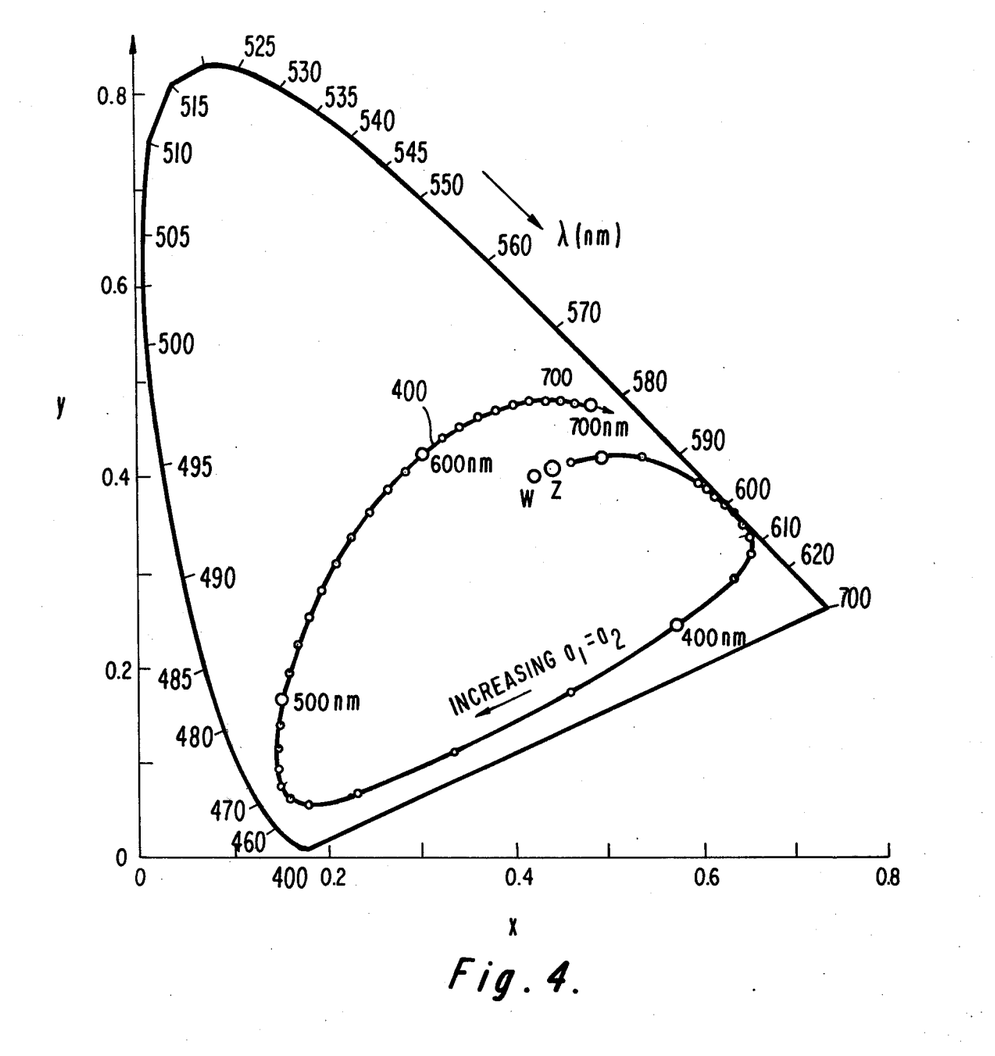
FIG. 4 is a CIE color chart showing the colorimetric parameters of zero order diffraction transmitted light from two sinusoidal gratings, which are angularly displaced by 90° with respect to each other and both of which have the same optical peak-to-peak amplitude.

Reference is now made to FIG. 4, which is a plot line 400 on a CIE color chart showing the wavelength (color) selectivity of the zero order diffraction light derived from two superimposed crossed sinusoidal gratings having equal optical depths ($a_1 = a_2$) as a function of the value of such optical depths. In FIG. 4, the effective white color W of the light source illuminating the diffractive structure is assumed to be 3200° K. Plot line 400 in FIG. 4 shows only the chromaticity characteristics of the zero diffraction order. A substantially neutral gray scale over the entire luminosity range from white to black would require that the chromaticity remain in the neighborhood of point W, such as point Z, for values of optical depths of the two crossed sinusoidal gratings from 0 to about 450 nm. However, as plot line 400 indicates, the chromaticity, of two crossed sinusoidal gratings of equal optical depth varies widely as a function of the value of optical depth and occupies "color-manifesting" points (shown in Table I below) remote from points W and Z over most of its length. Therefore, a gray scale provided by crossed sine wave gratings having the same optical depth in not neutral, but manifests an observable color at each point thereof. Further, this observable color is not constant over the gray-scale range from black to white, but varies with the value of optical depth, as indicated by the shape and position of plot line 400 within the CIE color chart shown in FIG. 4, as shown in Table I.

TABLE I

| optical depth ($a_1 = a_2$) | color manifested |
| --- | --- |
| 350 nm | red-brown |
| 410 nm | magenta |
| 450 nm | blue |

The zero order transmittance T of two crossed sine-wave gratings as a function of wavelength is $$T = J_0^2(\frac{\pi}{\lambda} a_1) \cdot J_0^2(\frac{\pi}{\lambda} a_2) \quad (2)$$

Figure 5A:
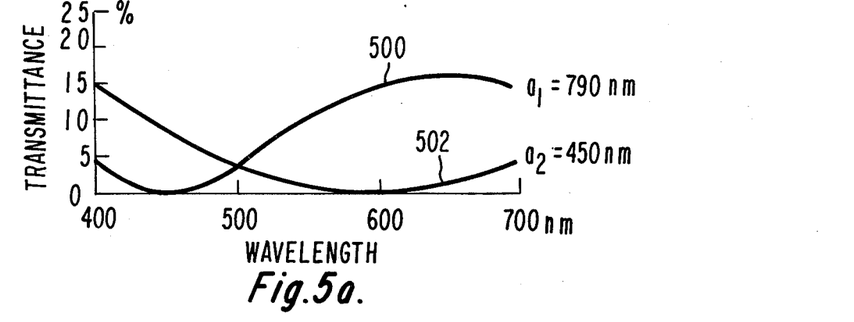
FIG. 5a shows respective graphs of the transmittance of respective sinusoidal gratings having respective first and second predetermined optical peak-to-peak amplitudes as a function of wavelength over the visible spectrum and FIG. 5b shows the transmittance of a diffractive subtractive filter consisting of two superimposed sinusoidal gratings, which are angularly displaced by 90° with respect to each other and which have respectively the aforesaid predetermined optical peak-to-peak amplitudes.

By properly selecting different optical depths $a_1$ and $a_2$ for each respective one of the two crossed sine-wave gratings, a low luminosity, substantially neutral black is obtainable. Specifically, using equation (1) above, FIG. 5a separately shows a first graph 500 of the zero-order transmittance as a function of wavelength over the visible spectrum of a sinusoidal grating having an optical depth $a_1$ of 790 nm and a similar graph 502 of a sinusoidal grating having an optical depth $a_2$ of 450 nm. As shown by graphs 500 and 502, the zero order transmittance as a function of wavelength for both a sinusoidal grating having an optical depth $a_1$ of 790 nm and a sinusoidal grating having an optical $a_2$ of 450 nm ranges from zero to about 15%. However, a sinusoidal grating having an optical depth of 790 nm exhibits zero transmittance to zero-order light at a wavelength of about 450 nm, while a sinusoidal grating having an optical depth $a_2$ of 450 nm exhibits a zero transmittance for zero-order light at a wavelength of nearly 600 nm.

Figure 5B:
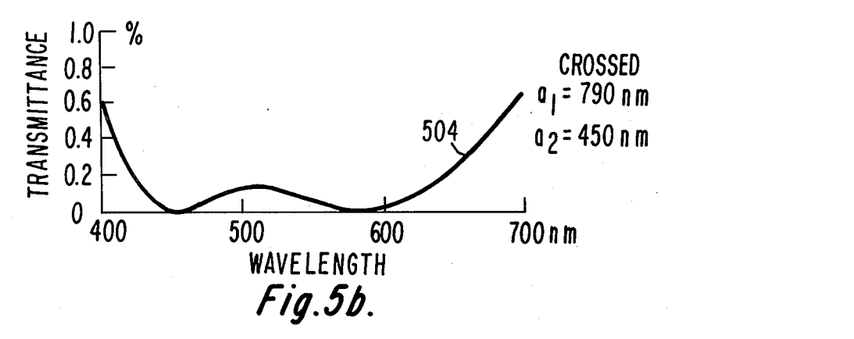

Using equation 2, FIG. 5b shows a graph of two crossed sine-wave gratings, one of which has an optical depth $a_1$ of 790 nm and one of which has an optical depth $a_2$ of 450 nm. The zero diffraction order transmittance of graph 504 of FIG. 5b is the product of the zero order transmittance of the individual sine-wave gratings at each wavelength in the visible spectrum. As can be seen from graph 504, the zero-order transmittance of the two crossed sine wave gratings having different optical depths is relatively small and is relatively independent of wavelength over most of the visible spectrum, as compared to the zero-order transmittance of the individual sine-wave gratings shown in graph 500 and 502. Therefore, the diffractive subtractive filter having a zero-order transmittance characteristic shown in graph 504 provides a relatively high density, neutral black transfer function, whose effective "color" in the CIE chart of FIG. 4 is at point Z.

The particular value of 790 nm for the optical depth $a_1$ of one of the crossed sinusoidal gratings and the particular value 450 nm for the optical depth $a_2$ of the other of the two crossed sine wave gratings is only illustrative. All that is required to obtain a more neutral black, than that obtainable by the prior art, is that the respective values of the optical depths, such as $a_1$ and $a_2$, of at least two superimposed, angularly-displaced sinusoidal gratings be selected so that they all exhibit a zero-order transmittance characteristic, similar to graphs 500 and 502, which goes through a minimum within the visible spectrum, and that the respective zero order transmittance minimum for each selected optical depth occurs at a separate and distinct wavelength in the visible spectrum. Preferably, the respective optical depths of two sine-wave gratings should differ from each other by at least 100 nm, to provide a more-or-less optimum resultant zero-order transmittance characteristic, similar to that shown by graphs 504, which exhibits a substantially neutral chromaticity point in the color chart of FIG. 4 in the neighborhood of points W and Z.

Although the present invention may be practiced with a diffractive structure composed of more than two crossed sine-wave gratings, all having different optical depths, there is little advantage in doing so. This is true because the mixed higher diffraction orders can then emerge closer to the zero-order so that they tend to be collected by the projection lens, leading to a further reduction in filter density and contrast. For example, if three gratings angularly displaced by 120° and all having equal periods of $d$ are employed, the (1, 1, 1) diffraction order is parallel to the zero-order direction. This can only be avoided if, in addition to choosing optimum orientations, one or more of the grating periods is reduced by about a factor of two or more. This reduction in grating period is however, undesirable from the recording viewpoint. Similar considerations hold for combinations of more than three gratings. Therefore, although more than two superimposed angularly-displaced gratings may be used, two crossed sine-wave gratings with 90° orientation to each other is to be preferred.

Figure 6:
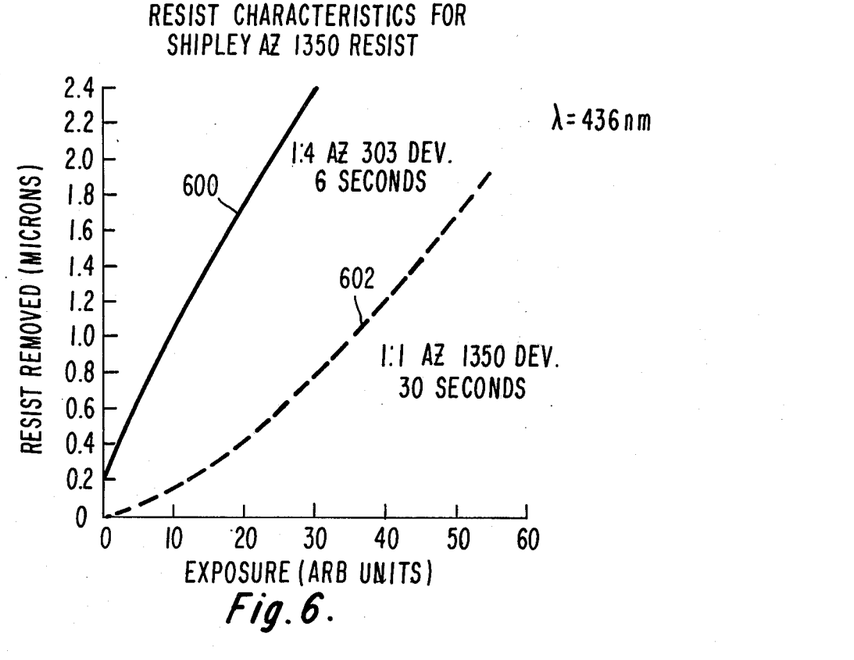
FIG. 6 shows two respective plots for the resist removed from SHIPLEY AZ1350 photoresist as a function of light exposure, one of the plots being obtained with a first type of development of the photoresist and the second plot being obtained with a second type of development of the photoresist.

One technique for recording an original diffractive structure, for use in deriving a diffractive subtractive filter embodying the features of the present invention, will now be described. Specifically, the recording medium used in SHIPLEY AZ1350 positive photoresist which exhibits different photoresist development characteristics for respective developers AZ1350 and AZ303, both of which are manufactured by the Shipley Co., Inc., Newton, Mass. The measured development characteristics of these developers for an exposing wavelength $\lambda = 436$ nm are shown in FIG. 6. As shown by plot 600, a 6 second development of AZ1350 positive photoresist in AZ303 developer at 1:4 dilution in water gives an approximately linear development characteristic of resist removed with respect to the amount of exposure which the photoresist has previously undergone. However, graph 602 shows that a 30 second development of AZ1350 positive photoresist in AZ1350 developer at 1:1 dilution in water provides a steeper, nonlinear development characteristic, which requires higher exposures, but does not attack the photoresist at unexposed areas thereof. The detailed form of these curves is a function of the recording wavelength and development time, but the general features remain. Similar results may also be found for other positive photoresists with suitable developers.

In making an original diffractive subtractive filter, an AZ1350 photoresist film is first spun-coated onto a suitable substrate, such as glass or plexiglass, to a film thickness of at least 2.5 $\mu$m, to thereby enable a deep wave profile to be formed. The photoresist is exposed first to a sinusoidal grating pattern of proper line spacing $d$, formed by a conventional two beam interference arrangement of light from a HeCd laser. The amount of exposure is selected in accordance with graph 600 to provide for a preselected physical depth $a'_1$ (which is equal to $\Delta n$ times the optical depth $a_1$) to be achieved on development for the first of the two sine wave gratings. The photoresist-coated substrate is then rotated through 90° and the second exposure is made of the second sine-wave grating. These two exposures may have a ratio of 16:9 to obtain respective grating depths which provide an optimum neutral zero order black, as described above. The photoresist is then developed in the 1:4 AZ303 developer for about 6 seconds to give a crossed sine-wave grating structure, wherein each of the two sine-wave gratings has a different proper grating depth. Development progress may be monitored by measuring the zero-order transmittance in the red (e.g. using a HeNe laser). Optimum depth for use in making polyvinyl chloride replicas is reached shortly after a minimum is reached in the red zero-order transmission (measured for the dry resist layer in air) or when the red zero-order transmission falls to about 27% (measured for the resist layer in water). The resulting resist grating blank is still light sensitive and, therefore, must be stored and handled in the dark or under yellow or red safe-lights.

The resulting resist grating blank, as so far described, may be used in this form, if desired, as master recording for deriving an embossed replica diffractive subtractive filter in a thermoplastic, such as polyvinyl chloride. Such a diffractive subtractive filter, which would provide a substantially uniform neutral "all-black" image, of the type shown in FIG. 3d, can be useful in itself. For instance, such an embossed all-black subtractive diffractive filter might be used as a diffractive grating substrate for producing the type of recording medium blanks described in U.S. Pat. Nos. 3,669,673 and 3,743,507 of Ih et al. Therefore, such a neutral all-black subtractive diffractive filter is contemplated by the present invention.

However, in most cases, the resulting photoresist grating blank, which comprises two crossed sine-wave gratings each having a different physical and optical depth, is not used directly in this form to derive diffractive subtractive filter replicas. Instead, the resulting photoresist grating blank is image-exposed to object-information light derived from a positive transparency. In particular, the positive transparency may be either imaged or contact printed onto the photoresist grating blank using either HeCd laser light or incoherent light from an ultraviolet lamp. The object information in the positive transparency is preferably already in the "half-tone" form. In this case, the gray scale, of the type shown in FIGS. 3a, 3b, 3c and 3d, is inherently derived in the image exposure, without the use of any additional screening. This approach gives the best results. However, if the object information in the positive transparency is not in half-tone form, the object information light from the positive transparency can be passed through an appropriate screen, similar to the screens used to provide half-tones in the printing art, before being incident on the photoresist grating blank, and the half-tone form generated in the subsequent development.

The image-exposed photoresist grating blank is then high-gamma developed by AZ1350 developer, discussed in connection with FIG. 6, to completely remove during development all areas and subareas of the photoresist grating blank which have been exposed to any light during image exposure. However, all areas and subareas of the photoresist blank which remained unexposed during image exposure are substantially unaffected during development by AZ1350 developer. This is true because, as shown in FIG. 6, the photoresist exposures required when using AZ1350 developer are considerably higher than those required when using AZ303 developer, as shown in FIG. 6. Therefore, the prior grating exposure alone does not lead to any significant photoresist removal during the later AZ1350 development of the object information image. This fact was confirmed experimentally by immersing gratings in a photoresist, recorded as above, for 30 seconds in 1:1 AZ1350 developer. It was found, in this case, that no change in the zero-order density or color was observable.

Since all those areas or subareas of the photoresist grating blank which received any light during the second object-information image exposure are completely removed during the AZ1350 development, the entire crossed sine-wave grating structure is removed from these particular exposed areas and subareas, leaving revealed corresponding flat substrate areas and subareas. These flat substrate areas and subareas define the white areas in the reconstructed picture, while the remaining areas and subareas define the black areas in the reconstructed picture. The final step is to produce a metal master from the resulting original photoresist recording for hot-pressing embossed replicas into thermoplastic sheets. Using this technique, high quality zero-order diffraction images have been recorded with full, neutral gray scale and a black density of approximately 1.8.

What is claimed is:

1. A diffractive subtractive light filter including at east one diffractive structure, said diffractive structure comprising at least two superimposed, angularly-spaced, substantially sine-wave profile phase gratings having a line spacing sufficient to permit the separation of substantially all higher-diffraction-order light from imaged zero-diffraction-order light, any of said phase gratings having an optical peak-to-peak amplitude of a selected value which provides a zero-diffraction-order-light transmittance wavelength selectivity characteristic which exhibits a minimum zero-diffrction-order-light transmittance at a wavelength within the visible wavelength spectrum; the improvement therein:
   wherein the optical peak-to-peak amplitude of each of said phase gratings has a sufficiently different selected value to render the wavelength selectivity, and hence the color selectivity, of the zero-diffraction-order light transmittance of said diffractive structure over the visible wavelength spectrum smaller than that which could be obtained if the optical peak-to-peak amplitude of each of said phase gratings all had substantially the same selected value.

2. The improvement defined in claim 1, wherein said diffractive structure consists of two superimposed sine-wave profile phase gratings which are angularly spaced by substantially 90°, and wherein the respective optical peak-to-peak amplitudes of said two phase gratings differ by at least 100 nanometers.

3. The improvement defined in claim 1, wherein said diffractive subtractive light filter comprises a substantially transparent medium exhibiting a given difference in index of refraction with respect to its surroundings, and wherein said diffractive structure comprises a relief pattern of said phase gratings embossed in a surface of said medium, with the peak-to-peak physical amplitude of each embossed phase grating being equal to the product of its selected optical peak-to-peak amplitude and said given difference in index of refraction.

4. The improvement defined in claim 3, wherein said diffractive structure consists of two superimposed sine-wave profile phase gratings which are angularly spaced by substantially 90°, and wherein the respective optical peak-to-peak amplitudes of said two phase gratings differ by at least 100 nanometers.

5. The improvement defined in claim 4, wherein the optical peak-to-peak amplitude of a first of said two gratings is substantially 450 nanometers and the optical peak-to-peak amplitude of a second of said two gratings is substantially 790 nanometers.

6. A diffractive subtractive light filter exhibiting a gray scale, said filter comprising:
   a. at least one region consisting of a mixture of black-manifesting subareas and white-manifesting subareas,
   b. each black-manifesting subarea comprising a diffractive structure composed of at least one substantially sine-wave profile phase grating having a line spacing sufficient to permit the separation of substantially all higher-diffraction-order light from imaged zero-diffraction-order light, any of said phase gratings having an optical peak-to-peak amplitude of a selected value which provides a zero-diffraction-order light transmittance wavelength selectivity characteristic which exhibits a minimum zero-diffraction-order light transmittance at a wavelength within the visible wavelength spectrum,
   c. each white-manifesting subarea comprising a substantially non-diffractive structure,
   d. the respective sizes of said individual subareas being sufficiently small to be substantially unresolvable in imaged zero-diffraction-order light, but being large relative to said line spacing,
   e. whereby said one region exhibits a relative luminosity which is determined by the proportion of the area of said one region comprised of said black-manifesting subareas compared to the proportion of said area of said one region comprised of white-manifesting subareas.

7. The diffractive subtractive light filter defined in claim 6,
   wherein each diffractive structure of a black-manifesting subarea is composed of at least two superimposed, angularly spaced, substantially sine-wave profile phase gratings, and
   wherein the optical peak-to-peak amplitude of each of said phase gratings has a sufficiently different selected value to render the wavelength selectivity, and hence the color selectivity, of the zero-diffraction-order-light transmittance of said diffractive structure over the visible wavelength spectrum smaller than that which could be obtained if the optical peak-to-peak amplitude of each of said phase gratings all had substantially the same selected value.

8. The diffractive subtractive light filter defined in claim 7, wherein said diffractive structure consists of two superimposed sine-wave profile phase gratings which are angularly spaced by substantially 90°, and wherein the respective optical peak-to-peak amplitudes of said two phase gratings differ by at least 100 nanometers.

9. The diffractive subtractive light filter defined in claim 6, wherein said diffractive subtractive filter comprises a substantially transparent medium exhibiting a given difference in index of refraction with respect to its surroundings, wherein any black-manifesting subarea diffractive structure comprises a relief pattern of any phase grating composing that diffractive structure embossed in a surface of said medium with the peak-to-peak physical amplitude of each embossed phase grating being equal to the product of its selected optical peak-to-peak amplitude and said given difference in index of refraction, and wherein any white-manifesting subarea comprises a substantially flat portion of said surface of said medium.

10. The diffractive subtractive light filter defined in claim 9,
wherein each diffractive structure of a black-manifesting subarea is composed of at least two superimposed, angularly spaced, substantially sine-wave profile phase gratings, and
wherein the optical peak-to-peak amplitude of each of said phase gratings has a sufficiently different selected value to render the wavelength selectivity, and hence the color selectivity, of the zero-diffraction-order-light transmittance of said diffractive structure over the visible wavelength spectrum smaller than that which could be obtained if the optical peak-to-peak amplitude of each of said phase gratings all had substantially the same selected value.

11. The diffractive subtractive light filter defined in claim 10, wherein said diffractive structure consists of two superimposed sine-wave profile phase gratings which are angularly spaced by substantially 90°, and wherein the respective optical peak-to-peak amplitudes of said two phase gratings differ by at least 100 nanometers.

12. The diffractive subtractive light filter defined in claim 11, wherein the optical peak-to-peak amplitude of a first of said two gratings is substantially 450 nanometers and the optical peak-to-peak amplitude of a second of said two gratings, is substantially 790 nanometers.

* * * * *

UNITED STATES PATENT OFFICE
CERTIFICATE OF CORRECTION

PATENT NO. : 4,062,628

DATED : 12/13/77

INVENTOR(S) : Michael Thomas Gale

It is certified that error appears in the above-identified patent and that said Letters Patent are hereby corrected as shown below:

Column 1, lines 40, 42, 44, 57 and 64 black should be --"black"--.

Column 1, line 45, after "incident" "in" should be --on--.

Column 1, lines 47, 49, 57 and 65 white should be --"white".

Column 2, line 47, between "as continuous" insert --a--.

Column 2, line 54, black should be --"black".

Column 3, line 27, (Caption) "DESCRIPTON" should be --DESCRIPTION--.

Column 4, line 14, "or" should be --for--.

Column 4, line 16, "nay" should be --may--.

Column 4, line 23, "tranmsissive" should be --transmissive--.

Column 4, line 44, "emittng" should be --emitting--.

Column 5, line 39, (first formula) "$J_0^2 \ T =$", should be -- $T = J_0^2$ --.

Column 5, line 43, "a" should be --$\underline{a}$--.

Column 5, line 34, "canot" should be --cannot.

Column 6, line 24, "a" should be --$\underline{a}$--.

Column 6, line 36 and 49 and 53 and 60 "a" should be --$\underline{a}$--.

Column 6, line 51 black should be --"black"--.

UNITED STATES PATENT OFFICE
CERTIFICATE OF CORRECTION

PATENT NO. : 4,062,628

DATED : 12/13/77

INVENTOR(S) : Michael Thomas Gale

It is certified that error appears in the above-identified patent and that said Letters Patent are hereby corrected as shown below:

Column 6, line 67, white should be "white".

Column 7, line 12 and 16, lighter-gray should be --"lighter-gray".

Column 7, lines 12, 13 and 14 darker-gray should be --"darker-gray"--.

Column 7, line 27, delete "a" before $a_1$.

Column 7, line 28, delete "a" before $a'_1$.

Column 7, line 31, black should be "black".

Column 7, line 66, "in" should be --is--.

Column 8, line 30, after optical insert --depth--.

Column 8, line 59, black should be --"black"--.

Column 10, line 20, after "as" insert --a--.

Column 10, lines 26 and 30 all balck should be --"all black".

Column 10, line 50, half-tone should be --"half-tone"--.

Column 10, line 55, half-tone should be --"half-tone"--.

UNITED STATES PATENT OFFICE
CERTIFICATE OF CORRECTION

PATENT NO. : 4,062,628
DATED : 12/13/77
INVENTOR(S) : Michael Thomas Gale

It is certified that error appears in the above-identified patent and that said Letters Patent are hereby corrected as shown below:

Claim 1, Column 11, line 29 "east" should be --least--.
Claim 1, Column 11, line 38, "diffrction" should be --diffraction--.

Signed and Sealed this

Fourth Day of July 1978

[SEAL]

Attest:

RUTH C. MASON
Attesting Officer

DONALD W. BANNER
Commissioner of Patents and Trademarks